United States Patent [19]

Schwelm

[11] Patent Number: 4,662,600
[45] Date of Patent: May 5, 1987

[54] ADJUSTABLE THROTTLE VALVE

[75] Inventor: Hans Schwelm, Kaarst, Fed. Rep. of Germany

[73] Assignee: Hydrolux S.a.r.l., Luxembourg

[21] Appl. No.: 531,482

[22] Filed: Sep. 9, 1983

[30] Foreign Application Priority Data

Sep. 10, 1982 [LU] Luxembourg ............................ 84377

[51] Int. Cl.$^4$ ...................... F16K 31/02; F16K 31/122
[52] U.S. Cl. ................... 251/30.03; 251/63; 251/43; 251/44
[58] Field of Search ........................ 251/29, 30, 38, 42, 251/43, 44, 122, 62, 63, 282, 30.03; 137/596.13; 60/452

[56] References Cited

U.S. PATENT DOCUMENTS

| 1,925,301 | 9/1933 | Campbell | 251/43 X |
| 2,630,137 | 3/1953 | Kronce et al. | 251/38 X |
| 2,805,038 | 9/1957 | Towler et al. | 251/29 X |
| 2,969,088 | 1/1961 | Kramer | 251/38 X |
| 3,076,630 | 2/1963 | Hammond | 251/38 X |
| 3,367,354 | 2/1968 | Gallant | 91/452 X |
| 3,389,796 | 6/1968 | Fiala et al. | 251/282 X |
| 3,405,906 | 10/1968 | Keller | 251/38 X |
| 3,787,027 | 1/1974 | Curnow et al. | 91/452 X |
| 4,250,914 | 2/1981 | Ferrentino | 251/282 X |
| 4,311,296 | 1/1982 | Scheffel | 251/29 |
| 4,362,088 | 12/1982 | Budzich | 137/596.13 X |

FOREIGN PATENT DOCUMENTS 2031616  4/1980  United Kingdom ................. 251/38

Primary Examiner—Samuel Scott
Assistant Examiner—Carl D. Price
Attorney, Agent, or Firm—Mason, Fenwick & Lawrence

[57] ABSTRACT

An adjustable throttle valve is controlled by a low pressure control pressure acting on a spring urged adjusting cylinder for positioning the end of a follow-up piston adjacent the end of a discharge channel extending the length of a throttle piston; power fluid flows from a source through a discharge opening between a housing and the throttle piston with the spring force, the control pressure, infeed pressure and discharge pressure acting in concert to maintain the end of the follow-up piston adjacent but slightly spaced from the end of the discharge channel for maintaining throttle piston equilibrium.

14 Claims, 3 Drawing Figures

ADJUSTABLE THROTTLE VALVE

BACKGROUND OF THE INVENTION

The present invention relates to an adjustable throttle valve consisting of a single or multi-part housing and having a control part and a throttle part, the throttle part containing a two-way seating valve with an axially movable hydraulically operated throttle piston which on one side connects a reserve supply channel via an annular restrictor with a consumption channel. The annular restrictor is formed between a seating surface of the throttle piston and a corresponding seating of the housing and is open to a greater or a smaller extent according to the axial position of the throttle piston, while on the other side it has a hydraulically actuated control surface connected to the reserve supply channel via a feed channel having a restrictor and to the consumption channel via a discharge channel. The said discharge channel has an aperture which is adjustable via the control part and which serves to regulate the pressure applied to the control surface, the said pressure determining the movement and position of the throttle piston.

Throttle valves of this kind are generally known and are used in many types of units. Among their numerous applications there are many, such as hydraulic presses and heavy-duty cranes, in which despite the size of the plant and the high hydraulic operating pressure, very precise movements have to be performed, so that exacting demands are made on the operating precision and accuracy of the throttle valves.

Unfortunately, the known throttle valves of the foregoing type only partly or inadequately satisfy the precision desirable for optimum accuracy of operation.

In the first place, conventional throttle valves involve excessive adjusting forces in the control part, which is a disadvantage from an economic point of view. In the second place, these known throttle valves involve excessive switching time for a number of applications, which detracts from their suitability for use. In addition, these known throttle valves are exposed to excessive wear, which unduly shortens their service life.

SUMMARY OF THE INVENTION

The primary object of the present invention is to enable a conventional throttle valve of the previously discussed type to be further constructed in such a way that the expensive preliminary control system with return force can be dispensed with and the over-all size of the apparatus reduced without sacrificing any of the known advantages of the valve and in particular without detracting from the operating efficiency. A control gap is formed between the end surface of the follow-up piston and the edge of the discharge channel when the valve is open, the said control gap remaining permanently within the order of magnitude of one micron throughout the interactions between the pressure on the control surface of the throttle piston and the pressure on the opposite side of the latter. Consequently, the throttle piston follows the axial control movements of the follow-up piston very accurately. This construction provides a means of highly accurate operation even in the case of large machines, i.e. those having an operating pressure of several hundred bar and a flow capacity of several thousand liters per minute.

Since the follow-up piston and the adjusting piston have an axial boring, the surfaces of the opposite sides of the throttle piston are subject to the same pressure. A fully suspended state of equilibrium is thus ensured between all pistons for any position to which the valve has been opened so that the hysteresis effects from which the known types of throttle valve suffer do not occur.

As the control pressure is independent of the operating pressure and the throttle piston is in suspended equilibrium at all times, the control pressure can be limited to twenty bar, even if the operating pressure amounts to several hundred bar.

The throttle valve according to the invention also has very low inertia, i.e. the time drift between the control input and the response is within the millisecond range.

Two examples of the invention will be described below by reference to the attached drawings.

BRIEF DESCRITPION OF THE DRAWING

DESCRIPTION OF THE PREFERRED EMBODIMENTS

Figure 1:
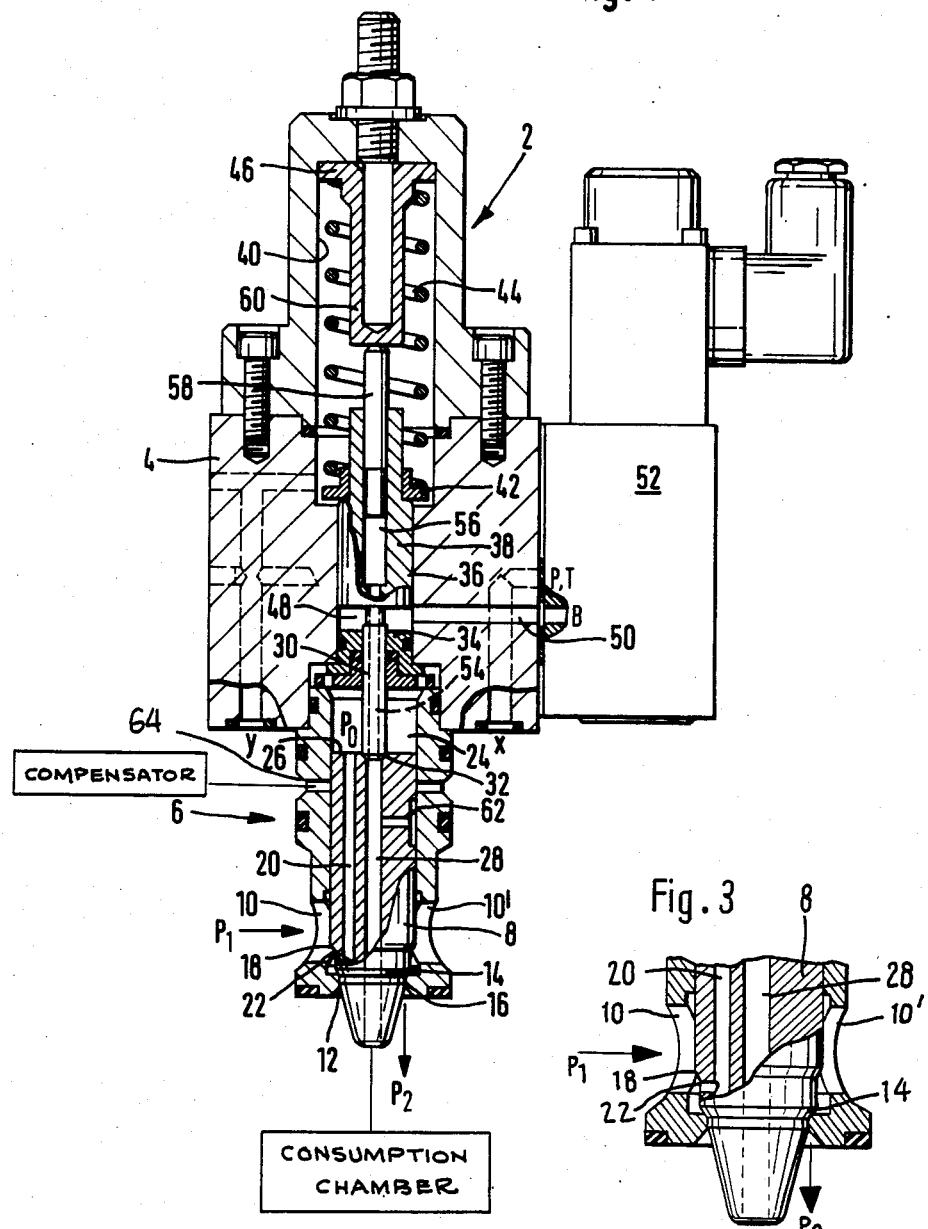
FIG. 1 is a side view, partly in vertical section of a first embodiment of the invention.
Figure 3:
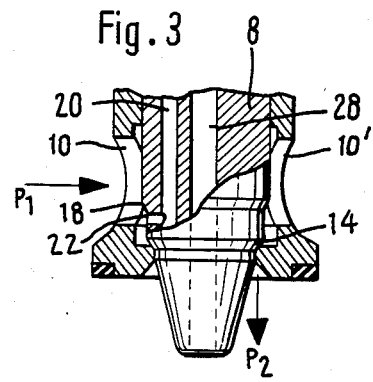
FIG. 3 is an enlarged view of the lower end of the embodiment of FIG. 1.

The two-way seating valves which are shown in the drawings, in which any given component retains one of the same reference number throughout, act as throttle valves in the direction of flow indicated by the arrows with the same reference numbers being used in the different figures for illustrating the same parts.

Figure 2:
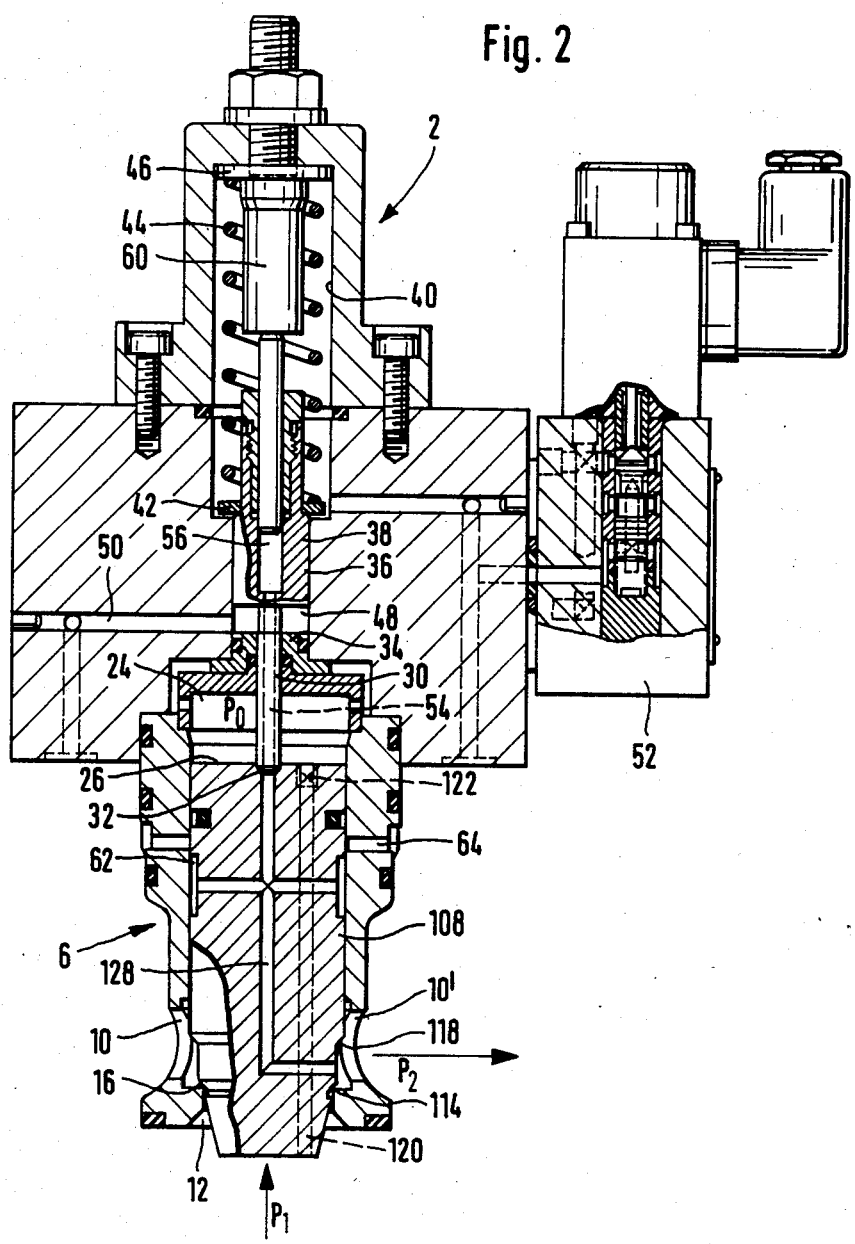
FIG. 2 is a side view, partly in section, of a second example.

The two valves of FIGS. 1 and 2 have a housing 4 which mainly consists of a throttle part 6 and a control part 2. Throttle part 6 includes a throttle piston 8 with the parts 6 and 8 in the example shown being movable axially in separate parts of a housing block having a through boring.

A cylindricl boring of the throttle part 6 receives the axially movable throttle piston 8 which communicates with fluid supply apertures 10 and 10' in throttle part 6 which also includes a discharge aperture 12. The end of throttle piston 8 includes a conical seating surface 14 engageable with a seat 16 to block the discharge aperture 12 when the piston is in a closed position. In the open position or piston 8 an annular flow passage is formed between the seating surface 14 and the seat 16 to permit the flow of oil from apertures 10 and 10' to a consumption channel (not shown) in which the lower end of throttle piston 8 is positioned.

As may be seen from the drawings, the diameter of the sealing surfaces, particularly of the seat 16, is smaller than the diameter of the cylindrical boring and the diameter of the throttle piston 8. An annular surface 18 of the throttle piston 8 thus subjected to the fluid supply pressure P1 provided in the fluid supply apertures 10 and 10' by a supply pump (not shown) which pumps oil to a reserve supply channel (not shown) with which the fluid supply apertures 10 and 10' communicate.

The throttle piston 8 has an oil feed channel 20 with a lower opening including a flow restrictor 22 which connects the reserve supply channel with a cylindrical chamber 24 situated above a control surface 26 of the throttle piston 8 which is on the opposite end of the throttle valve from seating surface 14. The throttle piston 8 also has an axial oil discharge channel 28 which connects the control surface 26 with the opposite throttle side of the piston 8 and leads into the consumption channel (not shown), where a pressure P2 prevails, P2 being lower than or equal to P1.

In the idle or closed position the oil discharge channel 28 is closed by the free end of a follow-up piston 30. For the sake of more satisfactory inter-action between the parts the upper edge of the discharge channel 28 is preferably constructed as a seating 32 widening out conically while the free end of the follow-up piston 30 can likewise take the form of a truncated cone so that a control passageway is defined between seating 32 and piston 30.

The follow-up piston 30 is axially movable in a sealed guide 34 and leads, in that side of the guide 34 which is opposite to the cylindrical chamber 28, into an adjusting cylinder 36. An adjusting piston 38, which is unitarily formed with the follow-up piston 30, is hermetically guided in the said adjusting cylinder 36. On that side of the adjusting piston 38 which is opposite to the follow-up piston 30 the said adjusting piston is provided with an annular ring 42 on a shoulder of piston 38 situated in a cylindrical boring 40 of the control part 2, the said boring being wider than the adjusting cylinder 36. Boring 40 contains a spiral spring 44 which rests on the one hand on the annular ring 42 and on the other on a spring retainer 46 situated opposite. The spiral spring 44 thus presses the adjusting piston 38 and the follow-up piston 30 in the direction of the position of rest illustrated, in which the free end of the follow-up piston 30 engages the seating 32 of the throttle piston 8 and closes the cylindrical chamber 24 in the direction of the discharge channel 28, so that the pressure transmitted via the oil supply channel 20 into this cylindrical chamber secures the throttle piston 8 in closed position on the housing seating 16.

The annular cylindrical chamber 48 around the follow-up piston 30 and between the guide 34 and the adjusting piston 38 is connected to a preliminary control apparatus 52 via a preliminary control pressure line 50. This preliminary control apparatus is a commercial apparatus known per se, with which, e.g. by means of a potentiometer, a preliminary control pressure Ps in the line 50 can be steplessly adjusted, e.g. from 0 to 20 bar, via a proportional magnetic and a pressure-limiting valve, although the maximum selectable preliminary control pressure must be sufficiently great to move the adjusting piston 38 axially in opposition to the force of the spiral spring 44.

According to one of the characteristics of the throttle valve shown the follow-up piston 30 is provided with an axial bore 54 by which the oil discharge channel 28 in the throttle piston is connected to an axial cylindrical bore 56 in the adjusting piston 38. The cross section of this boring is particularly important because, as will be shown farther on, this cross section is required to be the same as that of the follow-up piston 30. This boring 56 contains a pin 58, likewise of the same cross section which hermetically closes the boring and rests inside the spiral spring 44 on a cylindrical projection 60 of the spring retainer 46. In the bore 56, therefore, the same pressure P2 prevails as in the consumption channel, so that normally the pin is secured against the projection 60 under the effect of this pressure and its position remains unchanged whether or not the adjusting piston 38 is moved in relation to the pin 58.

According to a further characteristic the throttle valve is provided with an integrated low pressure feed back. For this purpose the oil discharge channel 28 is connected to a lateral recess 62 on the outer surface of the throttle piston 8. This recess 62, when the throttle piston 8 is open, transmits the pressure P2 of the consumption channel via a line 64 to a compensator in order to compensate, in the known manner, that part of the pressure prevailing in the consumption channel which is not required, so that the pump is not continuously subjected to its maximum load.

The blocking function of the throttle valve covered by the invention will be obvious, without any further explanations, from the foregoing description, referring to the position shown in the diagrams. It might merely be repeated that the pressure P1 prevailing in the reserve supply channel is transmitted into the cylindrical chamber 24 via elements 22, 20 and that when the follow-up piston 30 occupies its extended position, i.e. when the preliminary control pressure Ps is absent or inadequate, the said pressure presses the throttle piston 8 against the seat 16.

If the preliminary control pressure Ps is increased by the apparatus 52 until the expansion force of a spiral spring 44 has been overcome the adjusting piston 38 is displaced and the free end of the follow-up piston 30 rises from its seating 32 on the throttle piston 8. In this process the axial oil discharge channel 28 is opened so that oil can flow out of the cylindrical chamber 24 into the consumption channel. The pressure P0 in the cylindrical chamber 24 which was previously equal to the pressure P1, now decreases in order to adapt itself to the lower pressure P2 on the consumption side. Owing to the pressure drop caused by the restrictor 22 in the oil supply channel 20 when the oil is flowing the pressure P0 in the cylindrical chamber 24 is now no longer influenced by the pressure P1, so that with decreasing pressure P0 the influence of the pressure P1 in the reserve channel on the annular surface 18 becomes greater and finally overcomes the force exerted by the pressure P0 on the annular control surface 26 of the throttle piston. The result is that the throttle piston 8 rises off its seating 16 and moves towards the follow-up piston 30 until the oil channel discharge 28 is closed on the impact of the seating 32 on the free- end of the piston 30. As soon as the oil discharge channel 28 has been closed the pressure P0 in the cylindrical chamber 24 is once again influenced by P1 via the oil supply channel 20 and rises until the force exerted on the annular control surface 26 counteracts the lifting force on the annular surface 18, so that the throttle piston is once again thrust away from the follow-up piston 30. As soon as the oil discharge channel 28 is once again opened, however, the pressure P0 in the cylindrical chamber once more decreases, and the foregoing processes are continuously repeated.

To enable the course taken by these processes to be understood more clearly they will now be described one by one. In reality, however, these processes are not repeated suddenly, as might have been assumed from the description. In particular as a result of the damping effect caused at the throttle point 22 they take place continuously. The continuously and rapidly changing pressure forces exerted on the throttle piston 8 remain in equilibrium with one another in such a way that on the control edge of the follow-up piston above the seat 32 a permanent control gap of the order of magnitude of one micron is formed and is maintained whether or not the follow-up piston is moved.

As the throttle piston 8 continuously follows the piston 30, the said throttle piston performs an exact movement or occupies an exact position proportional to the preliminary control pressure Ps, so that they are likewise in proportion to the opening of the restrictor over the seat 16 between the reserve supply channel and the consumption channel.

It is important to emphasize that the movements of the throttle piston 8, i.e. the opening and closing of the throttle valve, are brought about by the pressure P1 in the reserve supply channel but that the control is effected by the pressure Ps. As the latter may be less than one tenth of the pressure P1, an extremely advantageous amplification effect is obtained.

As already previously mentioned, the through borings 54 and 56 of the pistons piston 30 and 38 play a very important part as regards the equalization of pressure. The annular control surface 26, owing to the opening of the oil discharge channel 28, is smaller than the opposite side of the throttle piston. Consequently, if the pressure P2 prevails through the aperture 12 on the piston 8 and acts on the complete surface of the head of the latter it may happen that the resulting pressure forces exceed those exerted by P0 in the cylindrical chamber 24 and the equilibrium is temporarily destroyed. This results in a hysteresis effect i.e. the pressure-volume characteristic will not be the same in the opening process as in the closing process.

Since, however, the pressure P2 is transmitted by the follow-up piston 30 into the bore 56, a force is exerted in the latter and via the pin 58 on the housing and, in particular, an opposite force in the direction of the follow-up piston. If, therefore, the cross section of the boring 56 coincides with that of the oil discharge channel 28, this interference is counteracted, a complete suspended state of equilibrium prevailing both for the throttle piston and for the follow-up an adjusting piston.

FIG. 2 shows a second example, in which the throttle effect takes place in the opposite directions although the method of operation remains the same. The same reference numbers have therefore been used for the respective components as in FIG. 1 while for corresponding components with similar functions corresponding three-figure numbers have been used.

In the example shown in FIG. 2 the reserve supply channel and the consumption channel have been interchanged in relation to FIG. 1, i.e. the reserve supply pressure P1 prevails on the surface of the head of the throttle piston 108, opposite to the aperture 12, while the construction pressure P2 prevails to one side opposite the aperture 10'.

An oil feed channel 120 with a restrictor 122 connects the reserve supply side to the cylindrical chamber 24 over the control surface 26 of the throttle piston 108. Similarly, an L-shaped oil discharge channel 128 connects the control surface 26 and the cylindrical chamber 24 to the consumption side, where the pressure P2 prevails.

Owing to the conical annular surface 118 and the seating 114 the annular control surface 26 is greater than the opposite surface of the head of the throttle piston 108. When the oil discharge channel 128 is closed, therefore, the pressure force exerted on the control surface 26 predominates, as a result of the pressure P1 transmitted through the channel 120, so that the piston 108 remains closed.

With the restrictor opened and the oil discharge channel 128 closed, the pressure force exerted on the annular control surface 26 predominates even though this surface is smaller than the whole of the opposite surface subjected to pressure. The annular surface 118 and the seating 114 are subjected to the already throttled oil pressure P2, which is less than P1, so that the total force of P1 and P2 is nevertheless less than the force exerted on the control surface 26 and thrusts the throttle piston 108 towards the seating 16. By this movement, however, the equilibrium is restored, because the piston 108 moves away from the follow-up piston 30 and the oil discharge channel 128 is opened, so that the pressure P0 in the cylindrical chamber 24 decreases. The method of operation of the throttle valve according to the version shown in FIG. 2 is thus identical to the method of operation of the throttle valve shown in FIG. 1. The throttle piston 108 thus continuously occupies the suspended position determined by the follow-up piston 30.

Finally it should be emphasized that both throttle valves in FIGS. 1 and 2 are self-locking, because when the pressure decreases in the preliminary control system, e.g. as a result of a break-down, the throttle valve remains closed under the effect of the pressure P1.

I claim:

1. An adjustable throttle valve adapted to supply hydraulic fluid to consumption chamber, comprising:
    a housing having a side wall, first and second ends, a control part on said side wall, a throttle part at said second end thereof, and a fluid supply aperture in said throttle part;
    a fluid supply source for providing pressurized hydraulic fluid at a first, substantially high, pressure to said fluid supply aperture;
    said throttle part having a longitudinal axis and including:
    (a) a discharge aperture at one end of said throttle part, said discharge aperature communicating with said consumption chamber;
    (b) a valve seat positioned adjacent to said discharge aperture;
    (c) a hydraulically operated throttle piston mounted for axial movement in said throttle part, said throttle piston including first and second ends, a hydraulically actuated control surface on said first end of said throttle piston, a seating surface on said second end of said throttle piston corresponding to and facing said valve seat in said throttle part, a substantially axial feed channel extending through said throttle piston, said axial feed channel connecting said control surface to said fluid supply aperture, said axial feed channel having a flow restrictor therein, an axial discharge channel extending through said throttle piston, said axial discharge channel connecting said control surface with the consumption chamber and said axial discharge channel having a regulating aperture therein opening at said control surface, said regulating aperture defining a facing end edge of said axial discharge channel; and
    (d) an annular flow passageway between said fluid supply aperture and said discharge aperture, the annular passageway defined by said seating surface of said throttle piston and said corresponding, facing valve seat, the annular passageway being variably open to a greater or smaller extent depending on the axial position of said throttle piston, whereby the passage of fluid between said fluid supply aperture and said discharge aperture can be throttled;

said control part including:
(a) a cylindrical chamber therein;
(b) a follow-up piston mounted for axial movement in said control part, said follow-up piston having first and second ends, said end being positioned in said cylindrical chamber, and an axial bore extending between said first and second ends of said follow-up piston, said first end of said follow-up piston being aligned with said discharge channel of said throttle piston and facing said facing end edge of said discharge channel, and forming in conjuction withsaid facing end edge of said discharge channel a control passageway which can be opened or closed, whereby the control pressure applied to said control surface can be regulated;
(c) an adjusting piston mounted for axial movement in said control part and drivingly connected to said follow up piston, said adjusting piston movable coaxially relative to said throttle piston, and said adjusting piston including an axial cylindrical bore in communication with the axial bore of said follow-up piston, the diameter of a portion of said axial cylindrical bore being substantially equal to the diameter of said follow-up piston, whereby the pressure on both ends of said follow up piston, whereby the pressure on both ends of said follow-up piston is the same and said follow-up piston is in a suspended state of equilibrium when said control passageway is open;
(d) spring means for exerting a force on said adjusting piston in a direction tending to result in the closing of said control passageway; and
(e) hydraulic control pressure providing means for exerting a control pressure on said adjusting piston in a direction opposite the force exerted by said spring means so as to tend to result in the opening of said control passageway, the control pressure being substantially less than said first pressure.

2. A throttle valve in accordance with claim 1, wherein said housing has a side and the hydraulic fluid enters said throttle part in a direction transverse to the axis of said throttle piston from said side of said housing and leaves said throttle part in an axial direction parallel to the axis of said throttle piston.

3. A throttle valve in accordance with claim 1, wherein the hydraulic fluid enters said throttle part in a direction flowing parallel to the axis of said throttle piston and emerges from said housing in a direction oriented transversely with respect to the axis of said throttle piston.

4. A throttle valve in accordance with claim 1, wherein said facing end edge of said discharge channel comprises a conical surface.

5. A throttle valve in accordance with claim 1, said control part further comprising a pin slideably mounted in said cylindrical bore of said adjusting piston and which has one end urged against said housing by hydraulic pressure in said cylindrical bore in said adjusting piston.

6. A throttle valve in accordance with claim 5, wherein said housing has a side and the hydraulic fluid enters said throttle part in a direction transverse to the axis of said throttle piston from said side of said housing and leaves said throttle part in an axial direction parallel to the axis of said throttle piston.

7. A throttle valve in accordance with claim 1, wherein said housing has a side and the hydraulic fluid enters said throttle part in a direction transverse to the axis of said throttle piston from said side of said housing and leaves said throttle part in an axial direction parallel to the axis of said throttle piston and said seating surface on one end of said throttle piston is a conical annular surface facing said valve seat.

8. A throttle valve in accordance with claim 7, wherein said facing end edge of said discharge channel comprises a conical surface.

9. A throttle valve in accordance with claim 1, wherein said spring means extends between said housing and said adjusting piston.

10. An adjustable throttle valve adapted to supply hydraulic fluid to a consumption chamber, comprising: accordance a housing having a side wall, first and second end, a control part on side wall, a throttle part at said second end thereof, and a fluid supply aperture in said throttle part a fluid supply source for providing pressurized hydraulic fluid at a first, substantially high, pressure to said fluid supply aperture;

said throttle part having a vertical axis and including:
(a) a discharge aperture at one end of said throttle part, said discharge aperature communicating with said consumption chamber;
(b) a valve seat positioned adjacent to said discharge aperture;
(c) a hydraulically operated throttle piston mounted for axial movement in said throttle part, an adjusting piston being movable coaxially relative to said throttle piston, said throttle piston including first and second ends, a hydraulically actuated control surface on said first end of said throttle piston a seating surface on said second end of said throttle piston, corresponding to and facing said valve seat in said throttle part, an axial feed channel extending through said throttle piston, said axial feed channel having a flow restrictor therein, said axial feed channel connecting said control surface to said fluid supply aperture, an axial discharge channel extending through said throttle piston, said axial discharge channel connecting said control surface with the consumption chamber and said axial discharge channel having a regulating aperture therein opening at said control surface, said regulating aperture defining a facing end edge of said axial discharge channel, and an integrated low pressure feed-back means comprising a lateral recess in said throttle piston, said recess being connected with said discharge channel and positioned opposite to and in communication with a discharge point of a pressure line in said throttle part; and
(d) an annular flow passageway between said fluid supply aperture and said discharge aperture, the annular passaway defined by said seating surface of said throttle piston and said corresponding, facing valve seat, the annular passageway being variably open to a greater or smaller extent depending on the axial position of said throttle piston, whereby the passage of fluid between said fluid supply aperture and said discharge aperture can be throttled;

said control part including:

(a) a cylindrical chamber therein;

(b) a follow-up piston mounted for axial movement in said control part, said follow-up piston having first and second ends, said second end being positioned in said cylindrical chamber, and an axial bore extending between said first and second ends of said follow-up piston, said first end of said follow-up piston being aligned with and facing said discharge channel of said throttle piston and facing said facing end edge of said discharge channel, and forming in conjunction with said facing end edge of said discharge channel, a control passageway which can be opened or closed, whereby the control pressure applied to said control surface can be regulated;

(c) an adjusting piston mounted for axial movement in said control part and drivingly connected to said follow-up piston, said adjusting piston being movable coaxially relative to said throttle piston, and said adjusting piston including an axial cylindrical bore in communication with the axial bore of said follow-up piston, the diameter of a portion of said axial cylindrical bore being substantially equal to the diameter of said follow up piston, whereby the pressure on both ends of said follow-up piston is the same and said follow-up piston is in a suspended state of equilibrium when said control passageway is open;

(d) spring means for exerting a force on said adjusting piston in a direction tending to result in the closing of said control passageway; and (e) hydraulic control pressure providing means for exerting a control pressure on said adjusting piston in a direction opposite the force exerted by said spring means so as to tend to result in the opening of said control passageway.

11. An adjustable throttle valve adapted to supply hydraulic fluid to a consumption chamber, comprising:
housing means;
a fluid supply aperture in said housing means;
a housing valve seat in said housing means;
a fluid supply source for providing pressurized hydraulic fluid at a first, substantially high, pressure to said fluid supply aperture;
a discharge aperture communicating with said housing valve seat and being at a pressure lower than said first pressure;
a throttle piston having an outer cylindrical surface, said throttle piston being mounted for movement in said housing means, said throttle piston having a first end and a second end, said first end having a sealing surface engagable with said housing valve seat for preventing fluid flow between said fluid supply aperture and said discharge aperture, and said second end having a throttle valve seat therein;
a flow chamber communicating with said throttle piston so that pressure in said flow chamber tends to urge said throttle piston toward said housing valve seat;
means including a feed channel for communicating said fluid supply source with said flow chamber;
a discharge channel extending through said throttle piston and having a first end communicating with said throttle valve seat to communicate with said flow chamber and a second end in communication with the consumption chamber;
a control chamber in said housing means;
guide means defining a wall of said flow chamber in alignment with said discharge channel;
a follow-up piston mounted for axial reciprocation in said guide means, the follow-up piston including an internal passageway extending along the length of said follow-up piston, said follow-up piston having first and second ends, said first end of said follow-up piston being engageable with said throttle valve seat on said second end of said throttle piston to place said internal passageway in communication with said discharge channel and preclude communication between said discharge channel and said flow chamber, said follow-up piston also being movable away from said throttle valve seat to provide a control passageway between said flow chamber and said discharge channel, and said second end of said follow-up piston extending into said control chamber;
an adjusting piston mounted in said control chamber for coaxial movement with respect to said throttle piston and being drivingly engaged with said second end of said follow-up piston;
an axial cylindrical bore extending through said adjusting piston and communicating with the axial bore of said follow-up piston, the diameter of a portion of said axial cylindrical bore being substantially equal to the diameter of said follow-up piston, whereby the pressure on both ends of said follow-up piston is the same and said follow-up piston is in a suspended state of equilibrium when said control passageway is opened;
means for urging said adjusting piston and said follow-up piston toward said throttle piston to tend to close said control passageway; and
control pressure providing means communicating with said control chamber for providing a control pressure for urging said adjusting piston in a direction away from said throttle piston so as to tend to open said control passageway, the control pressure being substantially less than said first pressure.

12. A throttle valve as recited in claim 11 wherein the control pressure is in the range of 0 to 20 bar and said first pressure is several hundred bar.

13. A throttle valve as recited in claim 11 additionally including:
pin piston means having a first end and a second end, said first end mounted in communication with said adjusting piston bore and said second end engaged with fixed abutment means so that pressure in said adjusting piston bore urges said pin piston toward said fixed abutment means.

14. An adjustable throttle valve adapted to supply hydraulic fluid to a consumption chamber, comprising:
housing means;
a fluid supply aperture in said housing means;
a housing valve seat in said housing means;

a fluid supply source for providing pressurized hydraulic fluid at a first, substantially high, pressure to said fluid supply aperture;

a discharge aperture communicating with said housing valve seat and being at a pressure lower than said first pressure;

a throttle piston having an outer cylindrical surface, said throttle piston being mounted for movement in said housing means, said throttle piston having a first end and a second end, said first end having a sealing surface engageable with said housing valve seat for preventing fluid flow between said fluid supply aperture and said discharge aperture, and said second end having a throttle valve seat therein;

a flow chamber communicating with said throttle piston so that pressure in said flow chamber tends to urge said throttle piston toward said housing valve seat;

means including a feed channel for communicating said fluid supply source with said flow chamber;

a discharge channel extending through said throttle piston and having a first end communicating with said throttle valve seat to communicate with said flow chamber and a second end in communication with the consumption chamber;

a control chamber in said housing means;

guide means defining a wall of said flow chamber in alignment with said discharge channel;

a follow-up piston mounted for axial reciprocation in said guide means, the follow-up piston including an internal passageway extending along the length of said follow-up piston, said follow-up piston having first and second ends, said first end of said follow-up piston being engageable with said throttle valve seat on said second end of said throttle piston to place said internal passageway in communication with said discharge channel and preclude communication between said discharge channel and said flow chamber, said follow-up piston also being movable away from said throttle valve seat to provide a control passageway between said flow chamber and said discharge channel, and said second end of said follow-up piston extending into said control chamber;

an adjusting piston mounted in said control chamber for coaxial movement with respect to said throttle piston and being drivingly engaged with said second end of said follow-up piston;

an axial cylindrical bore extending through said adjusting piston and communicating with the axial bore of said follow-up piston, the diameter of a portion of said axial cylindrical bore being substantially equal to the diameter of said follow-up piston, whereby the pressure on both ends of said follow-up piston, whereby the pressure on both ends of said follow-up piston is the same and said follow-up piston is in a suspended state of equilibrium when said control passageway is open;

means for urging said adjusting piston and said follow-up piston toward said throttle piston to tend to close said control passageway;

control pressure providing means communicating with said control chamber for providing a control pressure for urging said adjusting piston in a direction away from said throttle piston so as to tend to open said control passageway; and an integrated low pressure feed-back signal providing means comprising a lateral recess in said outer cylindrical surface of said throttle piston, a passageway connecting said lateral recess with said discharge channel, and a line communicable with a compensator communicating with said lateral recess in response to movement of said throttle piston away from said valve seat.

* * * * *